United States Patent
Xu et al.

(10) Patent No.: US 8,335,166 B2
(45) Date of Patent: Dec. 18, 2012

(54) METHOD AND APPARATUS FOR DETERMINING A ROUTE METRIC

(75) Inventors: Xianchao Xu, Beijing (CN); Weihua Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 12/519,757

(22) PCT Filed: Dec. 27, 2006

(86) PCT No.: PCT/CN2006/003613
§ 371 (c)(1),
(2), (4) Date: Nov. 19, 2009

(87) PCT Pub. No.: WO2008/077282
PCT Pub. Date: Jul. 3, 2008

(65) Prior Publication Data
US 2011/0317567 A1    Dec. 29, 2011

(51) Int. Cl.
*G01R 31/08* (2006.01)
*H04J 1/16* (2006.01)
*G06F 11/00* (2006.01)
*G06F 15/173* (2006.01)

(52) U.S. Cl. ........ 370/252; 370/232; 370/235; 709/224; 709/238

(58) Field of Classification Search .................. 370/231, 370/232, 235, 254, 389; 709/223, 224, 238
See application file for complete search history.

(56) References Cited

U.S. PATENT DOCUMENTS

| | | | | |
|---|---|---|---|---|
| 6,914,883 | B2* | 7/2005 | Dharanikota | 370/230.1 |
| 6,934,259 | B2* | 8/2005 | Klincewicz et al. | 370/238 |
| 2002/0120766 | A1* | 8/2002 | Okajima et al. | 709/232 |
| 2005/0083848 | A1 | 4/2005 | Shao et al. | |
| 2008/0031149 | A1* | 2/2008 | Hughes et al. | 370/252 |

FOREIGN PATENT DOCUMENTS

| | | |
|---|---|---|
| JP | 2004056787 A | 2/2004 |
| KR | 20060010067 A1 | 2/2006 |
| WO | WO-02/33896 | 4/2002 |
| WO | WO-2005/040959 A2 | 5/2005 |
| WO | WO-2006/070172 A1 | 7/2006 |

(Continued)

OTHER PUBLICATIONS

Office Action Received for European Patent Application No. 06840656.0, mailed on Oct. 24, 2011, 5 pages of Office Action.

(Continued)

*Primary Examiner* — Ricky Ngo
*Assistant Examiner* — Paul H Masur
(74) *Attorney, Agent, or Firm* — Forefront IP Lawgroup, PLLC

(57) ABSTRACT

Machine-readable media, methods, apparatus and system for determining a route metric are described. In some embodiments, a characteristic of a packet to be sent from a node to another node is analyzed. The characteristic of the packet may indicate at least one of a group consisting whether the packet is transmission quality sensitive and whether the packet is transmission throughput sensitive. Then, a weight relationship between a packet loss rate and a data rate may be determined, in which the weight relationship may vary with the characteristic of the packet. A route metric for a route from the node to the another node may be determined based upon the packet loss rate, the data rate and the weight relationship.

28 Claims, 3 Drawing Sheets

FOREIGN PATENT DOCUMENTS

| | | |
|---|---|---|
| WO | WO-2006/122287 | 11/2006 |
| WO | WO-2008/077282 A1 | 7/2008 |

OTHER PUBLICATIONS

Notice of Allowance Received for Chinese Patent Application No. 200680056830.X, mailed on Aug. 26, 2011, 2 pages of Notice of Allowance and 2 pages of English Translation.

Notice of Preliminary Rejection for Korean Patent Application No. 10-2009-7013167, Mailed Dec. 21, 2010, 5 pages.

Supplementary European Search Report for European Patent Application No. 06840656, Mailed Dec. 13, 2010, 6 pages.

Office Action Received for Chinese Patent Application No. 200680056830.X, mailed on Jan. 26, 2011, 6 pages of Office Action and 13 pages of English translation.

Supplementary European Search Report for European Patent Application No. 06840656, mailed on Jan. 13, 2011, 1 page.

Office Action Received for Japanese Patent Application No. 2009-543318, mailed on Sep. 27, 2011, 2 pages of Office Action and 2 pages of English translation.

Office Action Received for Korean Patent Application No. 10-2009-7013167, mailed on Aug. 31, 2011, 3 pages of Office Action and 3 pages of English translation.

Charles E. Perkins et al., Ad-hoc On-Demand Distance Vector Routing, 11 pages.

Douglas S. J. De Couto et al., A High-Throughput Path Metric for MultiHop Wireless Routing, Sep. 14-19, 2003, 13 pages, San Diego, California, USA.

Ellen Moyse, International Preliminary Report on Patentability, Patent Cooperation Treaty, PCT/CN2006/003613, Jun. 30, 2009, 4 pages, Geneva, Switzerland.

Richard Draves et al., Routing in Multi-Radio, Multi-Hop Wireless Mesh Networks, Sep. 26-Oct. 1, 2004, 15 pages, Philadelphia, Pennsylvania, USA.

Rui Yang, Written Opinion of the International Searching Authority, Patent Cooperation Treaty, PCT/CN2006/003613, Oct. 18, 2007, 3 pages, Beijing, China.

* cited by examiner

METHOD AND APPARATUS FOR DETERMINING A ROUTE METRIC

CROSS REFERENCE TO RELATED APPLICATION

This patent application is a U.S. National Phase application under 35 U.S.C. §371 of International Application No. PCT/CN2006/003613, filed on Dec. 27, 2006, entitled METHOD AND APPARATUS FOR DETERMINING A ROUTE METRIC.

BACKGROUND

Two algorithms may be commonly used to measure a route metric in a mesh network: ETX (expected transmission count) and ETT (expected transmission time). ETX metric may measure a packet loss rate for each link between two neighboring nodes along a route. ETT metric may take the packet loss rate and data rate into account and use min $\{ETX_{rate}/Rate\}$ as a metric for the each link, in which $ETX_{rate}$ may represent different packet loss rates under different data rates.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for determining a route metric. In the following description, numerous specific details such as logic implementations, pseudo-code, methods to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
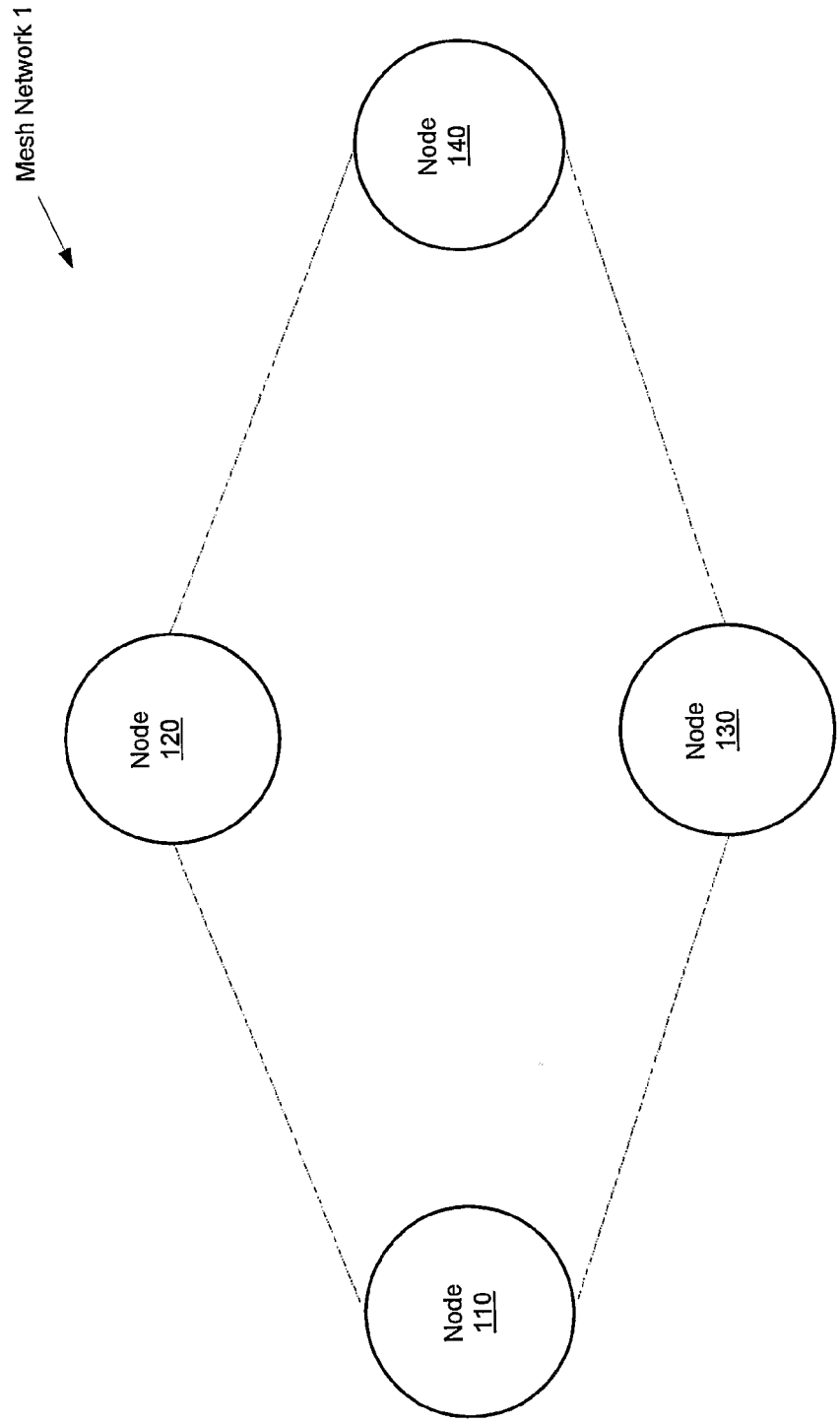
FIG. 1 shows an embodiment of a mesh network comprising a plurality of nodes.

An embodiment of a mesh network 1 comprising a plurality of nodes is shown in FIG. 1. As shown, the mesh network may comprise four nodes 110, 120, 130 and 140. However, it should be appreciated that the mesh network 1 may have any number of nodes. Each node may have one or more neighboring nodes and two neighboring nodes may communicate with each other via a wireless link. Examples for the node may comprise mainframe computers, mini-computers, personal computers, portable computers, laptop computers, and other devices for transceiving and processing data.

Many protocols may be adopted for routing in the mesh network, such as Ad-hoc On Demand Distance Vector Routing (AODV) protocol. These protocols may determine a route to direct data from a source node (e.g., node 110) to a destination node (e.g., node 140) based upon various factors, such as packet loss rate and data rate. A routing protocol may define a route metric to measure a certain characteristic for each route between the source node and the destination node and select a route to direct data based upon the route metric. For example, there may be two routes from node 110 to node 140, such as a route through nodes 110, 120, and 140 and a route through nodes 110, 130, and 140. The routing protocol may measure a route metric for each route and select a route to direct data between node 110 and node 140 based upon the route metric.

Although FIG. 1 shows the mesh network, it should be appreciated that the present invention could be used for other types of network.

Figure 2:
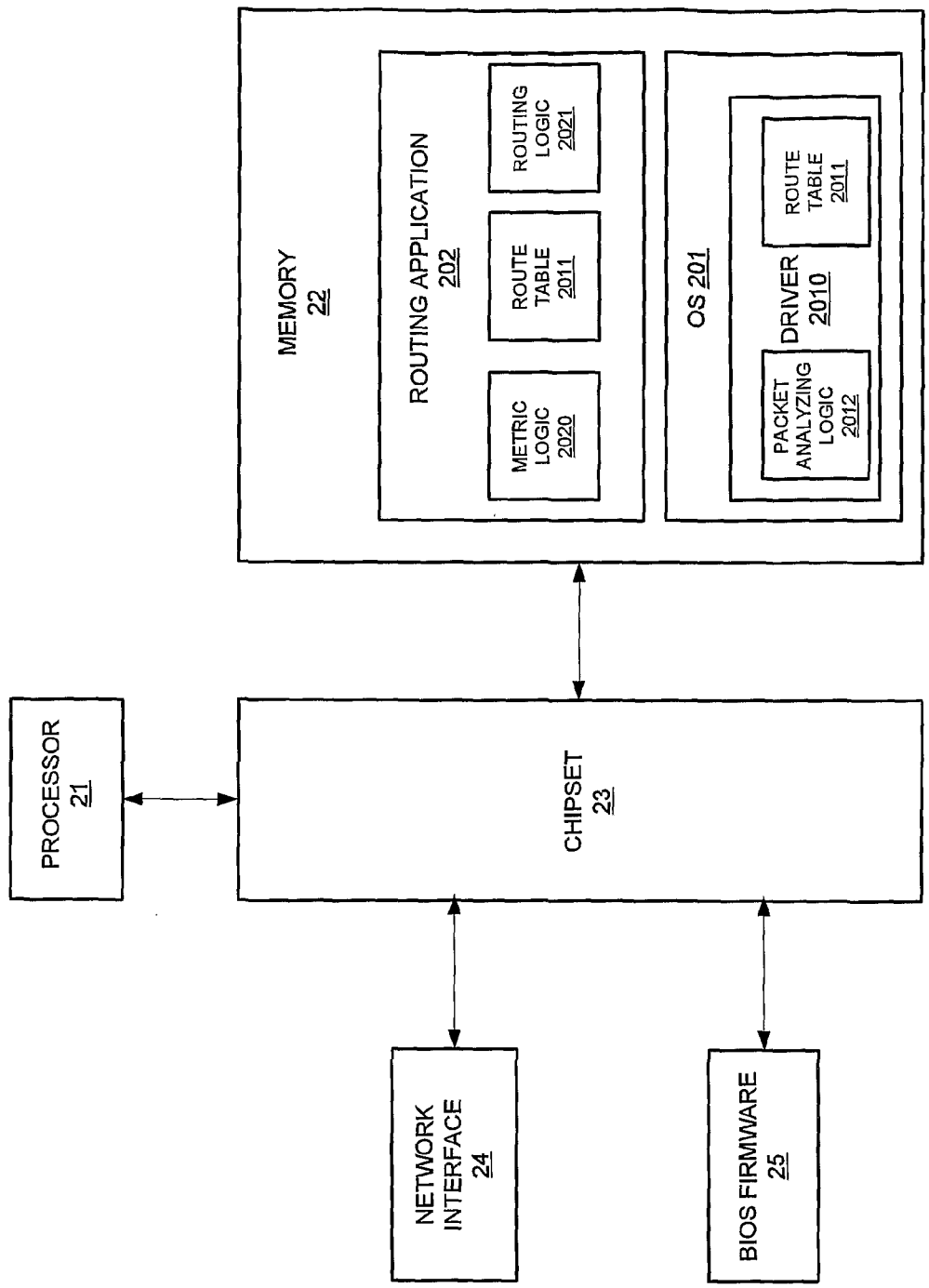
FIG. 2 shows an embodiment of a node in the mesh network.

FIG. 2 shows an embodiment of a node in the mesh network. As shown, the node may comprise one or more processors 21, memory 22, chipset 23, network interface 24, firmware 25 and possibly other components. The one or more processors 21 may be communicatively coupled to various components (e.g., the chipset 23) via one or more buses such as a processor bus. The processors 21 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

The memory 22 may store instructions and data in the form of an operating system 201 and a routing application 202. Examples for the memory 22 may comprise one or any combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

The operating system 201 may control tasks that the node may carry out and manage system resources to optimize performance. Examples of the operating system 201 may include, but is not limited to, different versions of Linux®, Microsoft® Windows®, and real time operating systems such as VxWorks®, etc. The operating system 201 may comprise a number of modules to bridge between overlying applications and underlying hardware and perform the resource optimization: For example, the operating system 201 may comprise a driver 2010 to control devices (e.g., network interface 24) according to commands from the user applications (e.g., routing application 202).

The driver 2010 may receive a routing command from the routing application 202 and instruct the network interface 24 to direct data to a destination node indicated in the routing command. The driver 2010 may further analyze a packet to be routed for any characteristic of interested, such as whether the packet is transmission quality sensitive (e.g., a voice packet) or whether the packet is transmission throughput sensitive (e.g., a file transfer protocol packet). The driver 2010 may report the characteristic of the packet to the routing application 202 for route metric calculation and/or route determination.

The driver 2010 may comprise a route table 2011 recording a plurality of routes from the node to a plurality of destination nodes. The route table 2011 may take various forms. For example, the route table 2011 may comprise a plurality of entries, each entry for each destination node. Each entry may comprise a plurality of items, such as the destination node, a next hop node, a route metric, a data rate, and a characteristic of a packet to be routed. The route table may use different ways to represent the packet characteristic. For example, the route table may use 'packet priority' that is no larger than 3 to represent that the packet is transmission quality sensitive, while use 'packet priority' that is larger than 3 to represent that the packet is transmission throughput sensitive.

The driver 2010 may further comprise a packet analyzing logic 2012 to analyze the characteristic of the packet. The characteristic may help the driver 2010 to search a route from the route table that corresponds to the packet characteristic or help the routing application 202 to determine a route metric for a route, in which the packet characteristic may help to determine a weight relationship between a packet loss rate and a data rate that are used to calculate the route metric.

The driver 2010 may search the route table for the route to direct data from the present node to the destination node and the route may correspond to the analyzed packet characteristic. However, if the driver 2010 can not find the route from the route table, the driver 2010 may notify the routing application 202 which may determine if a route from the present node to the destination node exists. In response that the route exists, the routing application 202 may calculate a route metric for the route according to the packet characteristic and add the route as well as its route metric into the route table. However, if there exists a number of routes from the present node to the destination node, for example, two routes may exist from node 110 to node 140, then the routing application 202 may calculate a route metric for each route according to the packet characteristic and select a route to route the data according to the route metrics.

The routing application 202 may comprise the route table 2011 to store routes for each destination node. The routing application 202 may keep the route table within itself consistent with the route table within the driver 2010 by updating the both route tables concurrently.

The routing application 202 may further comprise a metric logic 2020 to calculate a route metric according to the packet characteristic analyzed by the driver 2010. The metric logic 2020 may use the following equation to calculate the route metric:

$$metric_{route} = \sum_{link=1}^{n} metric_{link} = \sum_{link=1}^{n} \min_{link}(p_{rate}/(a+b*\text{rate}))$$

$metric_{route}$ may represent a metric for a route and $metric_{link}$ may represent a metric for a link of the route. Two neighboring nodes may establish a link, for example, a link between nodes 110 and 120. n may be an integer and may represent the number of links that the route may have. For example, route (110, 120, 140) may have two links, i.e., link (110, 120) and link (120, 14). rate may represent a data rate on a link and data may be transmitted on the link with different data rates. $p_{rate}$ may represent a packet loss rate under a data rate and different data rates may associate with different packet loss rates. a and b may be parameters that may determine a weight relationship between the packet loss rate ($p_{rate}$) and the data rate (rate).

As stated above, the packet characteristic may help the metric logic 2020 determine the weight relationship between the packet loss rate and the data rate. For example, the metric logic 2020 may assign a greater weight to the packet loss rate than to the data rate if the packet is transmission quality sensitive, while assigning a greater weight to the data rate than to the packet loss rate if the packet is transmission throughput sensitive. In the case of the above equation, parameter a may be larger than parameter b (e.g., a=10 and b=1) for a quality sensitive packet, while parameter b may be larger than parameter a (e.g., b=10 and a=1) for a throughput sensitive packet.

Other algorithms may calculate the route metric in other ways. For example, the metric logic 2020 may calculate the route metric with the following equation:

$$metric_{route} = \sum_{link=1}^{n} metric_{link} = \sum_{link=1}^{n} \min_{link}((a+b*p_{rate})/\text{rate}).$$

The routing application 202 may further comprise a routing logic 2021 to select a route based upon the route metric for each available route from the present node to the destination node. For the route metric calculated with the equation $$metric_{route} = \sum_{link=1}^{n} metric_{link} = \sum_{link=1}^{n} \min_{link}(p_{rate}/(a+b*\text{rate})),$$

the routing logic 2021 may select the route with the minimum route metric. The routing logic 2021 may perform other functions, such as updating the route table 2011 with a new route.

According to the present invention, the routing application 202 may select different route for different packet with different characteristic, even though same pairs of packet loss rate and data rate are used. For example, three pairs of packet loss rate and data rate may be used for data transmission on the link between nodes 110 and 120 and the link between nodes 120 and 140.

| Packet loss rate | Data rate |
| --- | --- |
| 50 | 54 |
| 40 | 36 |
| 10 | 6 |

Another three pairs of packet loss rate and data rate may be used for data transmission on the link between nodes 110 and 130 and the link between nodes 130 and 140.

| Packet loss rate | Data rate |
| --- | --- |
| 60 | 54 |
| 50 | 36 |
| 7 | 6 |

The metric logic 2020 may determine the parameters a and b to be 10 and 1 for transmission of a quality sensitive packet and to be 1 and 10 for transmission of a throughput sensitive packet. Therefore, for the transmission quality sensitive packet, the route metric for the route through nodes 110, 120 and 140 may be:

$$metric_{110\text{-}120\text{-}140} = metric_{110\text{-}120} + metric_{120\text{-}140}$$

$$= \min\left\{\begin{array}{c} 50/(10+1*54), 40/(10+1*36), \\ 10/(10+1*6) \end{array}\right\} +$$

$$\min\left\{\begin{array}{c} 50/(10+1*54), 40/(10+1*36), \\ 10/(10+1*6) \end{array}\right\}$$

$$= 1.25$$

and, the route metric for the route through nodes 110, 130 and 140 may be:

$$metric_{110\text{-}130\text{-}140} = metric_{110\text{-}130} + metric_{130\text{-}140}$$

$$= \operatorname{Min}\left\{\begin{array}{c} 60/(10+1*54), 50/(10+1*36), \\ 7/(10+1*6) \end{array}\right\} +$$

$$\min\left\{\begin{array}{c} 60/(10+1*54), 50/(10+1*36), \\ 7/(10+1*6) \end{array}\right\}$$

$$= 0.875$$

However, for the transmission throughput sensitive packet, the route metric for the route through nodes 110, 120 and 140 may be:

$$metric_{110\text{-}120\text{-}140} = metric_{110\text{-}120} + metric_{120\text{-}140}$$

$$= \min\left\{\begin{array}{c} 50/(1+10*54), 40/(1+10*36), \\ 10/(1+10*6) \end{array}\right\} +$$

$$\min\left\{\begin{array}{c} 50/(1+10*54), 40/(1+10*36), \\ 10/(1+10*6) \end{array}\right\}$$

$$= 0.185$$

and, the route metric for the route through nodes 110, 130 and 140 may be:

$$metric_{110\text{-}130\text{-}140} = metric_{110\text{-}130} + metric_{130\text{-}140}$$

$$= \operatorname{Min}\left\{\begin{array}{c} 60/(1+10*54), 50/(1+10*36), \\ 7/(1+10*6) \end{array}\right\} +$$

$$\min\left\{\begin{array}{c} 60/(1+10*54), 50/(1+10*36), \\ 7/(1+10*6) \end{array}\right\}$$

$$= 0.222$$

Accordingly, the routing logic 2021 may select route (110, 130, 140) for the transmission quality sensitive packet, while selecting route (110, 130, 140) for the transmission throughput sensitive packet.

The chipset 23 may provide one or more communicative paths among one or more processors 21, memory 22 and other components, such as the network interface 24 and the firmware 25.

The network interface 24 may transceive a packet through the mesh network. Examples of the network interface 24 may include a network card, a bluetooth device, an antenna, and other devices for transceiving data.

The firmware 25 may store BIOS routines that the node executes during system startup in order to initialize processors 21, chipset 23, and other components of the node and/or EFI routines to interface the firmware 25 with the operating system 201 and provide a standard environment for booting the operating system 201.

Figure 3:
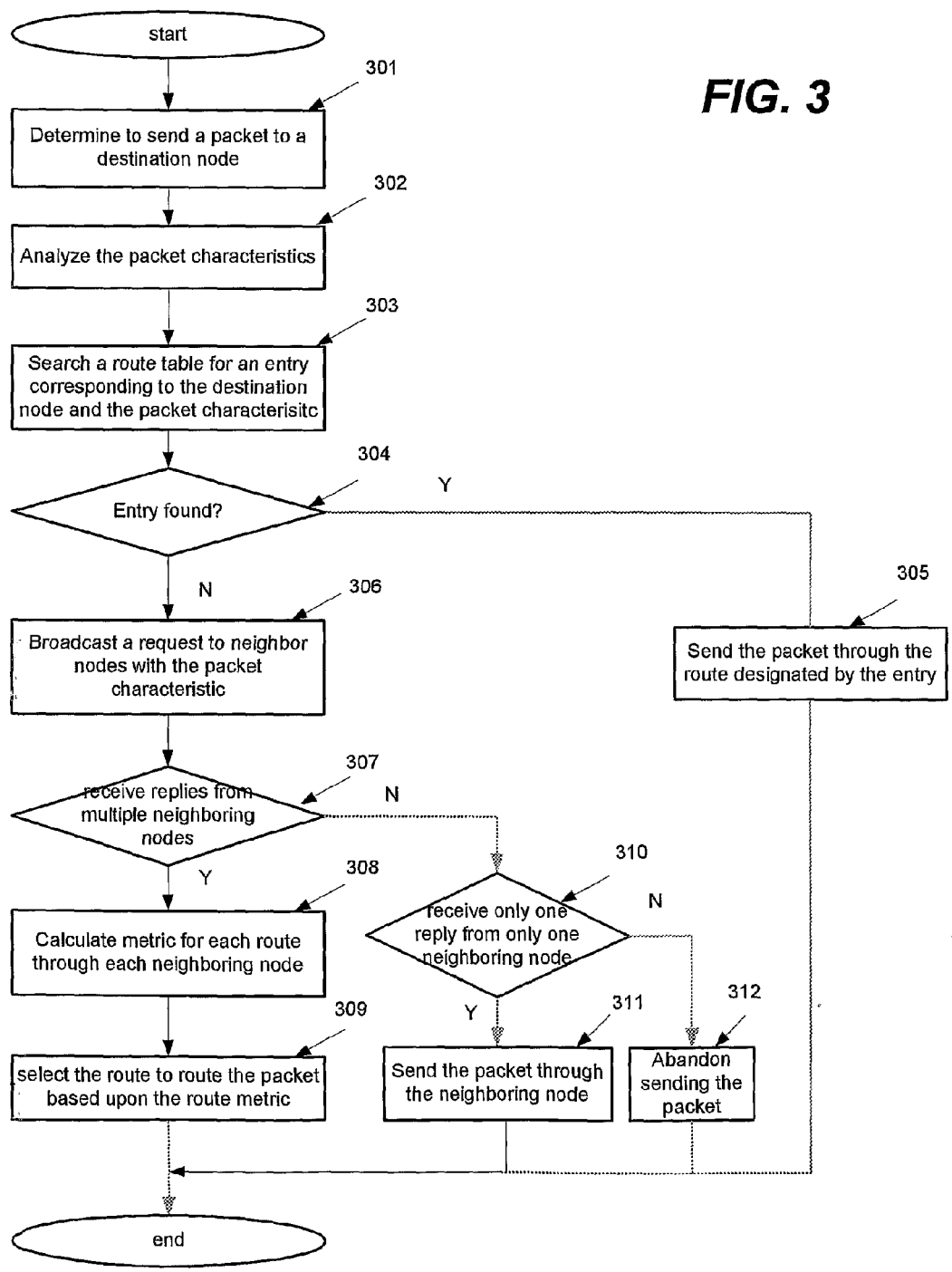
FIG. 3 shows an embodiment of a method of selecting a route according to a route metric by the node in the mesh network.

FIG. 3 shows an embodiment of a method of selecting a route according to a route metric. In block 301, a source node (e.g., node 110) may determine to transmit a packet to a destination node (e.g., node 140). In block 302, the driver 2010 of the source node may analyze a characteristic of the packet. For example, the characteristic may indicate whether the packet is transmission quality sensitive or transmission throughput sensitive. In block 303, the source node may search the route table 2011 for an entry corresponding to the packet characteristic and the destination node.

If the entry is found in block 304, the driver 2010 of the source node may send the packet through the route designated by the entry in block 305. If the entry is not found in block 304, the source node may broadcast a route request to its neighboring node(s) to request a route from the neighboring node(s) to the destination node in block 306. For example, the node 110 may broadcast the route request to nodes 120 and 130 to request a route from each neighboring node to the destination node 140.

The route request may comprise the destination node and the packet characteristic. The neighboring node may search its own route table for the requested route that may correspond to the packet characteristic and the destination node and may send back a route request reply comprising the requested route to the node. However, if the requested route is not found from the route table stored in the neighboring node, the neighboring node may broadcast another route request to its neighboring node(s) and may send back a route request reply to the source node if the route is ultimately found.

If the source node receives a plurality of route request replies from a plurality of neighboring nodes (e.g., from nodes 120 and 130) in block 307, the metric logic 2020 of the node may calculate a route metric for each route designated by each of the route request replies in block 308. For example, the each route may be from the source node to the destination node through each of the neighboring nodes that may send out the route request replies (e.g., the route through nodes 110, 120 and 140 and/or the route through nodes 110, 130 and 140). The metric logic 2020 may further utilize the packet characteristic to determine the weight relationship between the packet loss rate and the data rate when calculating the route metric.

Then, in block 309, the routing logic 2021 of the source node may select a route to route the packet from the source node to the destination node based upon the route metrics calculated in block 308. For example, the routing logic 2021 may select the route with the minimum route metric. Meanwhile, the routing logic 2021 may update the route table by adding the selected route as well as its route metric into the route table.

If only one route request reply is received in block 310, the driver 2010 of the node may send the packet through the route designated by the route request reply in block 311. For example, the route may be from the node to the destination node through the neighboring node that may send out the route request reply. Meanwhile, the routing logic 2021 may calculate a route metric for the route and update the route table by adding the route as well as its route metric into the route table. In response that no route request reply is received in block 310, the node may abandon sending the packet, at block 312.

Other technologies may implement other embodiments for the method of selecting a route. For example, the route request reply may further comprise a route metric for the route from the neighboring node to the destination node. Then, the source node may only need to calculate a link metric for a link between the source node and the neighboring node and obtain the route metric for the route from the source node to the destination node by adding the link metric to the route metric in the route request reply.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
analyzing a characteristic of a packet, wherein the characteristic of the packet indicates at least one of a group consisting whether the packet is transmission quality sensitive and whether the packet is transmission throughput sensitive;
determining a weight relationship between a packet loss rate and a data rate for a route, wherein the weight relationship varies with the characteristic of the packet; and
determining a route metric for the route based upon the packet loss rate, the data rate and the weight relationship, wherein the route metric is determined based upon the following equation:

$$metric_{route} = \sum_{link=1}^{n} metric_{link} = \sum_{link=1}^{n} \min_{link} (p_{rate}/(a+b*\text{rate}))$$

wherein, $metric_{route}$ represents the route metric, $metric_{link}$ represents each link metric for each link of the route, n is an integer and represents a number of links that the route has, rate represents the data rate, $p_{rate}$ represents the packet loss rate under the data rate, a and b are parameters to determine the weight relationship between the packet loss rate and the data rate.

2. The method of claim 1, wherein the weight relationship is determined by assigning a greater weight to the packet loss rate than to the data rate if the packet is transmission quality sensitive.

3. The method of claim 1, wherein the weight relationship is determined by assigning a greater weight to the data rate than to the packet loss rate if the packet is transmission throughput sensitive.

4. The method of claim 1, wherein if the route comprises a plurality of links, then the route metric is determined by a summation of a plurality of link metrics, wherein each link metric is for each of the plurality of links and is a function of the packet loss rate, the data rate and the weight relationship.

5. A method, comprising:
analyzing a characteristic of a packet, wherein the characteristic of the packet indicates at least one of a group consisting whether the packet is transmission quality sensitive and whether the packet is transmission throughput sensitive;
determining a weight relationship between a packet loss rate and a data rate for a route wherein the weight relationship varies with the characteristic of the packet; and
determining a route metric for the route based upon the packet loss rate, the data rate and the weight relationship, wherein the route metric is determined based upon the following equation:

$$metric_{route} = \sum_{link=1}^{n} metric_{link} = \sum_{link=1}^{n} \min_{link} ((a+b*p_{rate})/\text{rate})$$

wherein, $metric_{route}$ represents the route metric, $metric_{link}$ represents each link metric for each link of the route, n is an integer and represents a number of links that the route has, rate represents the data rate, $p_{rate}$ represents the packet loss rate under the data rate, a and b are parameters to determine the weight relationship between the packet loss rate and the data rate.

6. The method of claim 5, wherein the weight relationship is determined by assigning a greater weight to the packet loss rate than to the data rate if the packet is transmission quality sensitive.

7. The method of claim 5, wherein the weight relationship is determined by assigning a greater weight to the data rate than to the packet loss rate if the packet is transmission throughput sensitive.

8. The method of claim 5, wherein if the route comprises a plurality of links, then the route metric is determined by a summation of a plurality of link metrics, wherein each link metric is for each of the plurality of links and is a function of the packet loss rate, the data rate and the weight relationship.

9. An apparatus, comprising:
a packet analyzing logic component to analyze a characteristic of a packet, wherein the characteristic indicates at least one of a group consisting whether the packet is transmission quality sensitive and whether the packet is transmission throughput sensitive; and
a metric logic component to determine a weight relationship between a packet loss rate and a data rate for a route, and to determine a route metric for the route based upon the packet loss rate, the data rate and the weight relationship, wherein the weight relationship varies with the characteristic of the packet, wherein the route metric is determined based upon the following equation;

$$metric_{route} = \sum_{link=1}^{n} metric_{link} = \sum_{link=1}^{n} \min_{link} /(p_{rate}(a + b*\text{rate}))$$

wherein, $metric_{route}$ represents the route metric, $metric_{link}$ represents each link metric for each link of the route, n is an integer and represents a number of links that the route has, rate represents the data rate, $p_{rate}$ represents the packet loss rate under the data rate, a and b are parameters to determine the weight relationship between the packet loss rate and the data rate.

10. The apparatus of claim 9, wherein the weight relationship is determined by assigning a greater weight to the packet loss rate than to the data rate if the packet is transmission quality sensitive.

11. The apparatus of claim 9, wherein the weight relationship is determined by assigning a greater weight to the data rate than to the packet loss rate if the packet is transmission throughput sensitive.

12. The apparatus of claim 9, wherein if the route comprises a plurality of links, then the route metric is determined by a summation of a plurality of link metrics, wherein each link metric is for each of the plurality of links and is a function of the packet loss rate, the data rate and the weight relationship.

13. An apparatus, comprising:
a packet analyzing logic component to analyze a characteristic of a packet, wherein the characteristic indicates at least one of a group consisting whether the packet is transmission quality sensitive and whether the packet is transmission throughput sensitive; and
a metric logic component to determine a weight relationship between a packet loss rate and a data rate for a route, and to determine a route metric for the route based upon the packet loss rate, the data rate and the weight relationship, wherein the weight relationship varies with the characteristic of the packet,
wherein the route metric is determined based upon the following equation;

$$metric_{route} = \sum_{link=1}^{n} metric_{link} = \sum_{link=1}^{n} \min_{link} ((a + b*p_{rate})/\text{rate})$$

wherein, $metric_{route}$ represents the route metric, $metric_{link}$ represents each link metric for each link of the route, n is an integer and represents a number of links that the route has, rate represents the data rate, $p_{rate}$ represents the packet loss rate under the data rate, a and b are parameters to determine the weight relationship between the packet loss rate and the data rate.

14. The apparatus of claim 13, wherein the weight relationship is determined by assigning a greater weight to the packet loss rate than to the data rate if the packet is transmission quality sensitive.

15. The apparatus of claim 13, wherein the weight relationship is determined by assigning a greater weight to the data rate than to the packet loss rate if the packet is transmission throughput sensitive.

16. The apparatus of claim 13, wherein if the route comprises a plurality of links, then the route metric is determined by a summation of a plurality of link metrics, wherein each link metric is for each of the plurality of links and is a function of the packet loss rate, the data rate and the weight relationship.

17. An apparatus, comprising:
a packet analyzing logic component to analyze a characteristic of a packet, wherein the characteristic of the packet indicates at least one of a group consisting whether the packet is transmission quality sensitive and whether the packet is transmission throughput sensitive; and
a metric logic component to determine a weight relationship between a packet loss rate and a data rate for each route of a plurality of routes, and to determine a plurality of route metrics for the plurality of routes, wherein each route metric of the plurality of route metrics is for each route and is determined based upon the packet loss rate, the data rate and the weight relationship for the each route, and wherein the relationship varies with the characteristic of the packet,
wherein the metric logic determines the each route metric based upon the following equation:

$$metric_{route} = \sum_{link=1}^{n} metric_{link} = \sum_{link=1}^{n} \min_{link} /(p_{rate}(a + b*\text{rate}))$$

wherein, $metric_{route}$ represents each route metric, $metric_{link}$ represents each link metric for each link of the each route, n is an integer and represents a number of links that each route has, rate represents the data rate for the each route, $p_{rate}$ represents the packet loss rate under the data rate, a and b are parameters that determine the weight relationship between the packet loss rate and the data rate.

18. The apparatus of claim 17, further comprising a route logic component to select a route from the plurality of routes, based upon the plurality of route metrics, to direct the packet.

19. The apparatus of claim 17, further comprising a driver to:
search a table for a route that corresponds to the characteristic of the packet;
send a route request to a plurality of neighboring nodes if the table does not record the route, the route request comprising the characteristic of the packet; and
receive a plurality of route request replies, each route request reply from each of the plurality of neighboring nodes and comprising a sub-route.

20. The apparatus of claim 19, wherein the metric logic determines the each route metric for the each route further based upon a sub-route metric for the sub-route.

21. The apparatus of claim 17, wherein the weight relationship is determined by assigning a greater weight to the packet loss rate than to the data rate if the packet is transmission quality sensitive.

22. The apparatus of claim 17, wherein the weight relationship is determined by assigning a greater weight to the data rate than to the packet loss rate if the packet is transmission throughput sensitive.

23. An apparatus, comprising:
a packet analyzing logic component to analyze a characteristic of a packet, wherein the characteristic of the packet indicates at least one of a group consisting whether the packet is transmission quality sensitive and whether the packet is transmission throughput sensitive; and a metric logic component to determine a weight relationship between a packet loss rate and a data rate for each route of a plurality of routes, and to determine a plurality of route metrics for the plurality of routes, wherein each route metric of the plurality of route metrics is for each route and is determined based upon the packet loss rate, the data rate and the weight relationship for the each route, and wherein the weight relationship varies with the characteristic of the packet, wherein the metric logic determines the route metric based upon the following equation:

$$metric_{route} = \sum_{link=1}^{n} metric_{link} = \sum_{link=1}^{n} \min\nolimits_{link} ((a + b * p_{rate})/\text{rate})$$

wherein, $metric_{route}$ represents the each route metric, $metric_{link}$ represents each link metric for each link of the each route, n is an integer and represents a number of links that the each route has, rate represents the data rate for the each route, $p_{rate}$ represents the packet loss rate under the data rate, a and b are integers that determine the weight relationship between the packet loss rate and the data rate.

24. The apparatus of claim 23, further comprising a route logic component to select a route from the plurality of routes, based upon the plurality of route metrics, to direct the packet.

25. The apparatus of claim 23, further comprising a driver to:
   search a table for a route that corresponds to the characteristic of the packet;
   send a route request to a plurality of neighboring nodes if the table does not record the route, the route request comprising the characteristic of the packet; and
   receive a plurality of route request replies, each route request reply from each of the plurality of neighboring nodes and comprising a sub-route.

26. The apparatus of claim 25, wherein the metric logic determines the each route metric for the each route further based upon a sub-route metric for the sub-route.

27. The apparatus of claim 23, wherein the weight relationship is determined by assigning a greater weight to the packet loss rate than to the data rate if the packet is transmission quality sensitive.

28. The apparatus of claim 23, wherein the weight relationship is determined by assigning a greater weight to the data rate than to the packet loss rate if the packet is transmission throughput sensitive.

* * * * *